(12) United States Patent
Petri et al.

(10) Patent No.: US 8,911,694 B2
(45) Date of Patent: Dec. 16, 2014

(54) TWO-STAGE HYDROPROCESSING APPARATUS WITH COMMON FRACTIONATION

(75) Inventors: John A. Petri, Wauconda, IL (US); Vedula K. Murty, Willowbrook, IL (US); Peter Kokayeff, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 442 days.

(21) Appl. No.: 12/894,202

(22) Filed: Sep. 30, 2010

(65) Prior Publication Data

US 2012/0080288 A1  Apr. 5, 2012

(51) Int. Cl.
| | | |
|---|---|---|
| *C10G 65/14* | (2006.01) | |
| *C10G 65/12* | (2006.01) | |
| *B01D 3/32* | (2006.01) | |
| *C10G 45/32* | (2006.01) | |
| *C10G 45/02* | (2006.01) | |
| *C10G 45/44* | (2006.01) | |
| *C10G 45/58* | (2006.01) | |
| *C10G 65/04* | (2006.01) | |
| *B01D 3/14* | (2006.01) | |

(52) U.S. Cl.
CPC ............... *C10G 45/32* (2013.01); *C10G 45/02* (2013.01); *C10G 45/44* (2013.01); *C10G 45/58* (2013.01); *C10G 65/04* (2013.01); *B01D 3/141* (2013.01); *B01D 3/143* (2013.01); *C10G 2300/1055* (2013.01); *C10G 2300/202* (2013.01); *C10G 2300/307* (2013.01); *C10G 2400/04* (2013.01)
USPC .............. 422/610; 422/129; 422/608; 196/46

(58) Field of Classification Search
CPC ................... B01D 3/141; B01D 3/143; C10G 2300/1055; C10G 2300/202; C10G 2300/307; C10G 2400/04; C10G 45/02; C10G 45/32; C10G 45/44; C10G 45/58; C10G 65/04
USPC .............................. 422/610, 608, 129; 196/46
See application file for complete search history.

(56) References Cited

U.S. PATENT DOCUMENTS

| | | | |
|---|---|---|---|
| 5,114,562 | A | 5/1992 | Haun et al. |
| 5,720,872 | A | 2/1998 | Gupta |
| 6,261,441 | B1 | 7/2001 | Gentry et al. |
| 6,379,532 | B1 | 4/2002 | Hoehn et al. |
| 6,379,535 | B1 | 4/2002 | Hoehn |
| 6,395,950 | B1 | 5/2002 | Rice |
| 6,407,303 | B1 | 6/2002 | O'Brien |
| 6,632,350 | B2 | 10/2003 | Gupta |

(Continued)

FOREIGN PATENT DOCUMENTS

| | | |
|---|---|---|
| EP | 665283 B1 | 3/2000 |
| WO | 2009008878 A1 | 1/2009 |

OTHER PUBLICATIONS

Perry's Chemical Engineer's Handbook, 2008, McGraw-Hill, 8th ed. 13-4-13-5.*
Maddox,"Refining: Integrated solutions for optimised ULSD economics",Petroleum Technology Quarterly, v 8, n 5, p. 95-101, Autumn 2003.
U.S. Appl. No. 12/894,197, filed Sep. 30, 2010, Petri et al.

(Continued)

*Primary Examiner* — Walter D Griffin
*Assistant Examiner* — Derek Mueller
(74) *Attorney, Agent, or Firm* — James C Paschall

(57) ABSTRACT

Two-stage hydroprocessing uses a common dividing wall fractionator. Hydroprocessed effluents from both stages of hydroprocessing are fed to opposite sides of the dividing wall.

14 Claims, 1 Drawing Sheet

(56) References Cited

U.S. PATENT DOCUMENTS

| | | |
|---|---|---|
| 6,835,301 B1 | 12/2004 | Ellis |
| 6,881,326 B2 | 4/2005 | Ackerson et al. |
| 7,005,057 B1 | 2/2006 | Kalnes |
| 7,622,034 B1 | 11/2009 | Thakkar |
| 2001/0042699 A1 | 11/2001 | Cash et al. |
| 2005/0247602 A1 | 11/2005 | Shih et al. |
| 2006/0260981 A1 | 11/2006 | Gosling |
| 2008/0230441 A1 | 9/2008 | Hunter |
| 2010/0155294 A1 | 6/2010 | Kokayeff |

OTHER PUBLICATIONS

U.S. Appl. No. 12/894,199, filed Sep. 30, 2010, Petri et al.

Pereira, Mild Hydrocracking Using IsoTherming Technology, 2008, 2008 Meeting of the NPRA.

Perry's Chemical Engineer's Handbook, 7th Ed., 1997, McGraw-Hill, pp. 13-6; 13-9.

Tilton, "Improvement of High Cetane Number Diesel Fuels by Hydrogenation", 1948, Industrial and Engineering Chemistry, vol. 40, No. 7, pp. 1269-1273.

\* cited by examiner

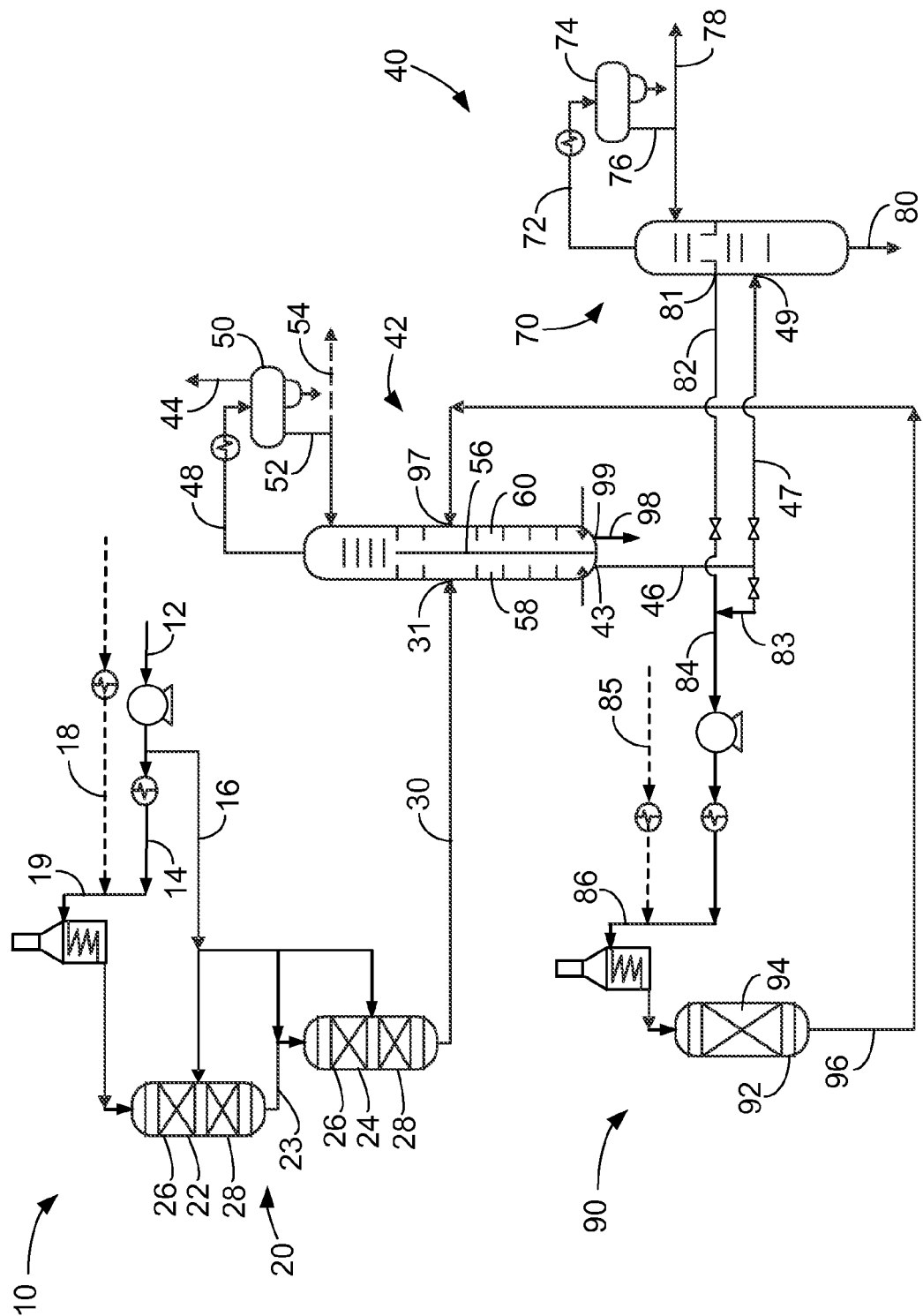

ional fractionation column. The second hydroprocessing reaction zone -->
TWO-STAGE HYDROPROCESSING APPARATUS WITH COMMON FRACTIONATION

FIELD OF THE INVENTION

The invention relates to hydroprocessing hydrocarbons in two stages with common fractionation.

BACKGROUND

It has been recognized that due to environmental concerns and newly enacted rules and regulations, saleable petroleum products must meet lower and lower limits on contaminates, such as sulfur and nitrogen. New regulations require essentially complete removal of sulfur from liquid hydrocarbons that are used in transportation fuels, such as gasoline and diesel. For example, ultra low sulfur diesel (ULSD) requirements are typically less than about 10 wppm sulfur.

Hydroprocessing is a process that contacts a selected feedstock and hydrogen-containing gas with suitable catalyst(s) in a reaction vessel under conditions of elevated temperature and pressure. The hydrogen is conventionally a separate phase in a three-phase system (gas/liquid/solid catalyst). Such hydroprocessing is commonly undertaken in a trickle-bed reactor where the continuous phase is gaseous and not liquid. The continuous gas phase is far in excess of stoichiometry requiring gas recovery, clean-up, compression and recycle back to the hydroprocessing reaction vessel.

Continuous liquid phase hydroprocessing with a liquid hydrocarbon stream and solid catalyst has been proposed to convert certain hydrocarbon streams into more valuable hydrocarbon streams with less hydrogen requirements. Continuous liquid phase hydroprocessing can operate without a gas recycle stream because the hydrogen requirements can be just over stoichiometric.

Hydrotreating is a type of hydroprocessing primarily active for the removal of heteroatoms, such as sulfur and nitrogen, and saturation of compounds in the hydrocarbon feedstock. Hydrotreating can typically increase the cetane number of a hydrocarbonaceous feed and prepare the feed for further hydroprocessing.

Fractionation columns are necessary to separate hydroprocessed effluents into separate products as distinguished by boiling point ranges. Naphtha, diesel and heavier products are typically recovered from hydroprocessed effluents.

There is a continuing need, therefore, for improved and cost effective methods to produce hydrocarbon streams that meet increasingly stringent product requirements. In particular, there is a need to provide ULSD in a cost effective and efficient manner without overtreating the heavier portions of the product streams.

SUMMARY

In an apparatus embodiment, the present invention comprises an apparatus for hydroprocessing hydrocarbonaceous feedstock comprising a first hydroprocessing reaction zone for hydroprocessing the hydrocarbonaceous feedstock. A dividing wall fractionation column includes a dividing wall extending to a bottom of the dividing wall fractionation column that divides the dividing wall fractionation column into a first side and a second side. The first side is in downstream communication with the first hydroprocessing reaction zone. A second hydroprocessing reaction zone is in downstream communication with the first side of the dividing wall fractionation column. The second hydroprocessing reaction zone hydroprocesses a feed diesel stream from the first side of the dividing wall fractionation column. Moreover, a second side of the dividing wall fractionation column is in downstream communication with the second hydroprocessing reaction zone.

In an additional apparatus embodiment, the present invention comprises an apparatus for producing low sulfur diesel comprising a first hydrotreating reaction zone for hydrotreating a hydrocarbonaceous feedstock to reduce its sulfur concentration and improve its cetane number. A dividing wall fractionation column includes a dividing wall extending to a bottom of the column that divides the dividing wall fractionation column into a first side and a second side. The first side is in downstream communication with the first hydrotreating reaction zone. A second hydroprocessing reaction zone is in downstream communication with the first side of the dividing wall column. The second hydroprocessing reaction zone hydroprocesses a feed diesel stream from the first side of the dividing wall fractionation column. Lastly, a second side of the dividing wall fractionation column is in downstream communication with the second hydroprocessing reaction zone.

In a further apparatus embodiment, the present invention comprises an apparatus for producing low sulfur diesel comprising a first hydrotreating reaction zone for hydrotreating a hydrocarbonaceous feedstock to reduce its sulfur concentration and improve its cetane number. A dividing wall fractionation column includes a dividing wall that divides the dividing wall fractionation column into a first side and a second side. The first side is in downstream communication with the first hydrotreating reaction zone. A second hydroprocessing reaction zone is in downstream communication with the first side of the dividing wall column. The second hydroprocessing reaction zone hydroprocesses a feed diesel stream from the first side of the dividing wall fractionation column. A second side of the dividing wall fractionation column is in downstream communication with the second hydroprocessing reaction zone. Lastly, a fractionator column is in downstream communication with the first side and in upstream communication with the second hydroprocessing reaction zone.

Other embodiments encompass further details of the process, such as preferred feedstocks, preferred hydroprocessing catalysts and preferred operating conditions to provide but a few examples. Such other embodiments and details are hereinafter disclosed in the following discussion of various aspects of the process.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities which may have a reboiler on its bottom and a condenser on its overhead. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the absolute pressure of the overhead vapor at the outlet of the column. The bottom temperature is the liquid bottom outlet temperature.

DETAILED DESCRIPTION

We have discovered a unique process and apparatus which uses a common fractionation zone between two hydroprocessing stages. Hydroprocessed effluent from a first hydroprocessing zone may be fed to a first side of a dividing wall in a dividing wall fractionation column. A diesel stream from the first side of the dividing wall is either fed directly to a second hydroprocessing zone or fractionated in a fractionator column to remove hydrotreated VGO to feed a feed diesel stream to the second hydroprocessing zone. A second effluent from the second hydroprocessing zone may be fed to a second side of the dividing wall in the dividing wall fractionation column to separate ULSD which may be recovered.

In one aspect, the apparatuses described herein are particularly useful for hydroprocessing a hydrocarbonaceous feedstock containing diesel or VGO boiling range hydrocarbons. Illustrative hydrocarbon feedstocks include hydrocarbonaceous streams having components boiling above about 288° C. (550° F.), such as atmospheric gas oils, vacuum gas oils, deasphalted, vacuum, and atmospheric residua, hydrotreated or mildly hydrocracked residual oils, coker distillates, straight run distillates, solvent-deasphalted oils, pyrolysis-derived oils, high boiling synthetic oils, cycle oils, cat cracker distillates, and the like. These hydrocarbonaceous feed stocks may contain from about 0.1 to about 4 percent sulfur.

A preferred hydrocarbonaceous feedstock is a diesel stream or other hydrocarbon fraction having at least about 50 percent by weight, and usually at least about 75 percent by weight, of its components boiling at a temperature above about 149° C. (300° F.). A typical diesel stream normally has a boiling point range between about 138° C. (280° F.) and about 382° C. (720° F.).

Another preferred hydrocarbonaceous feedstock is a VGO or other hydrocarbon fraction having at least about 50 percent by weight, and usually at least about 75 percent by weight, of its components boiling at a temperature above about 371° C. (700° F.). A typical vacuum gas oil normally has a boiling point range between about 315° C. (600° F.) and about 565° C. (1050° F.).

Turning to the FIGURE, an exemplary integrated hydrocarbon processing unit will be described in more detail. It will be appreciated by one skilled in the art that various features of the above described process, such as pumps, instrumentation, heat-exchange and recovery units, condensers, compressors, flash drums, feed tanks, and other ancillary or miscellaneous process equipment that are traditionally used in commercial embodiments of hydrocarbon conversion processes have not been described or illustrated. It will be understood that such accompanying equipment may be utilized in commercial embodiments of the flow schemes as described herein. Such ancillary or miscellaneous process equipment can be obtained and designed by one skilled in the art without undue experimentation.

The FIGURE shows a process and apparatus 10 for producing low sulfur diesel. A hydrocarbonaceous feedstock is introduced in line 12 and may be split between an initial stream 14 and a quench stream 16. The initial stream is preheated and combined with a hydrogen gas stream 18. The hydrogen gas stream may be provided from a make-up gas compressor (not shown). In an aspect, hydrogen in line 18 is only provided via a make-up gas compressor supplied from a general refinery hydrogen supply. The hydrogen gas stream from line 18 is admixed with the hydrocarbonaceous feedstock line 12 to provide an admixture of the hydrocarbonaceous feedstock and hydrogen in line 19.

The combined stream 19 is heated in a fired heater and fed to a first hydroprocessing reaction zone 20 or stage. The first hydroprocessing reaction zone 20 may have more than one hydroprocessing reactor 22. The first hydroprocessing reaction zone 20 shown in the FIGURE has a first hydroprocessing reactor 22 and a second hydroprocessing reactor 24. More hydroprocessing reactors are contemplated. Each of the hydroprocessing reactors 22, 24 may have just one bed of hydroprocessing catalyst 26 or have multiple hydroprocessing catalyst beds 26, 28. The quench stream 16 may bypass feed heaters and be divided up and fed to the effluent from a hydroprocessing catalyst bed or hydroprocessing reactor to cool the hot hydroprocessed effluent. A first hydroprocessed effluent exits the first hydroprocessing reaction zone 20 in line 30.

One or both of the hydroprocessing reactors 22, 24 in the hydroprocessing reaction zone 20 may be operated in a continuous liquid phase. Continuous liquid phase hydroprocessing involves introducing a liquid phase hydrocarbonaceous feedstock and hydrogen into a hydroprocessing reactor. The hydrogen should be present in a sufficiently low concentration to maintain a continuous liquid phase in the hydroprocessing reactor but high enough concentration to provide sufficient hydrogen for hydroprocessing of the hydrocarbonaceous feed. In other words, a continuous plenum of hydrocarbon liquid should extend from a feed inlet to an effluent outlet of the reactor 22, 24. Hydrogen gas may be present outside of the liquid plenum or inside of the liquid plenum in the forms of slugs or bubbles. At the very least, the volume of the liquid in the reactor will be greater than the volume of the gas in the reactor.

During the hydroprocessing reactions occurring in the hydroprocessing reactor 22, 24, hydrogen is necessarily consumed. Hydrogen may be provided to the reactor at a first feed inlet in excess or additionally replaced by one or more hydrogen inlet points located downstream of the first feed inlet (not shown). The flow rate of hydrogen added at these downstream locations is controlled to ensure that the reactor operates in a continuous liquid phase. The maximum flow rate of hydrogen that may be added to the reactor 22, 24 is less than the flow rate which would cause a transition from a continuous liquid phase to a continuous vapor phase.

In some aspects, the hydrocarbonaceous feedstock does not contain recycled product from a hydroprocessing reactor or other hydrocarbon diluent. In other aspects, a recycle stream or diluent (both not shown) may be incorporated into the fresh hydrocarbonaceous feedstock prior to hydroprocessing to feed additional volume to the reactor to provide added hydrogen-carrying capacity to the hydrocarbonaceous feedstock or to provide additional mass to reduce the temperature rise in catalyst bed 26, 28. In such aspects, any recycled product or diluent typically is introduced into the feedstock in line 14 before a hydrogen stream in line 18 is mixed with the feedstock. Typically, such recycled product may be previously stripped of a vaporous hydrogen sulfide, nitrogen or nitrogen containing compositions, and any other vapor phase materials.

In one aspect, the fresh hydrocarbonaceous feed in line 14 is provided and mixed with a hydrogen flow in line 18 from a make-up gas compressor or other similar hydrogen source. The hydrogen flow is mixed into the fresh hydrocarbonaceous feed for the hydroprocessing reaction zone 20 and is provided at a rate at least sufficient to satisfy the hydrogen requirement of the first reactor 22 and the second reactor 24 if present. In some instances, the flow rate of added hydrogen will include an amount in excess of the predicted hydrogen requirements of the hydroprocessing reaction zone 20 as reserve in event the hydrogen consumption exceeds the expected amount at a particular bed 26, 28 or reactor 22, 24.

In other aspects, hydrogen is added to the fresh feed stream to provide sufficient hydrogen to exceed the saturation point of the hydrocarbonaceous liquid so that a small vapor phase is present throughout the substantially liquid phase. Thus, there is, in some aspects, sufficient additional hydrogen in the small vapor phase to provide additional dissolved hydrogen to the continuous liquid hydrocarbon phase as the reaction consumes hydrogen. For example, the amount of added hydrogen may be about 10 to 20 wt-% greater than the expected collective hydrogen requirements of each hydroprocessing catalyst bed 26, 28. In yet other aspects, it is expected that the amount of hydrogen may be up to about 100 percent of saturation to about 1000 percent of the saturated liquid phase hydrocarbon. Excess hydrogen is carried in the effluent from the first hydroprocessing reactor 22 in either solution, a gaseous phase, or both in a gaseous phase and solution in the liquid effluent stream 23 carrying effluent from the first hydroprocessing reactor 22 to the second hydroprocessing reactor 24. In this aspect, no other hydrogen is added to the hydroprocessing reaction zone 20. In other aspects, supplemental hydrogen may be added to the hydroprocessing reactors 22, 24. It will be appreciated, however, that the amount of hydrogen added to the hydroprocessing reaction zone 20 can vary depending on the feed composition, operating conditions, desired output, and other factors. In an aspect, the liquid hydrocarbonaceous feed may include about 67 to about 135 Nm$^3$ hydrogen per m$^3$ oil (400 to 800 scf/bbl). In this aspect, a continuous gas phase may exist along with the continuous liquid phase extending from feed inlet to product outlet or each reactor 22, 24. As such, about 4 to about 25 Nm$^3$ hydrogen per m$^3$ oil (25 to 150 scf/bbl) may exit the outlet from a catalyst bed 26, 28 or each outlet of a reactor 22, 24.

The hydroprocessing that takes place in the first hydroprocessing reaction zone can include, without limit, hydrotreating such as hydrodesulfurization or saturation, hydrocracking and hydroisomerization. In a preferred aspect, the first hydroprocessing reaction zone 20 is a hydrotreating reaction zone 20. In this aspect, one or all of the hydroprocessing reactors 22, 24 are hydrotreating reactors 22, 24 with one bed 26 or more beds 26, 28 of hydrotreating catalyst. Moreover, in this aspect, the first hydroprocessed effluent may be a first hydrotreated effluent.

Although not shown, the first hydroprocessed effluent in line 30 may be flashed to separate gas from liquid and a relief valve installed on the gas line to relieve the hydroprocessing reaction zone 20 in the event of over pressurization. The gas and liquid stream may be recombined downstream of the relieve valve.

The fractionation zone 40 comprises a fractionation column 42. The fractionating column 42 fractionates the first hydroprocessed effluent entering through inlet 31 to provide a light gas stream in the off-gas line 44 and a diesel stream in a bottoms stream 46. In an embodiment, an overhead line 48 removes vapor from a top of the fractionating column 42. The vapor from line 48 is condensed and deposited in a receiver 50. The off-gas line 44 removes light gas from a top of the receiver 50, and unstabilized naphtha from a bottom of the receiver in line 52. An aqueous phase may be removed from a boot in the receiver 50. At least a portion of the unstabilized naphtha may be refluxed to the fractionation column 42, while unstabilized naphtha may be recovered in line 54 for further processing. The top pressure in the fractionation column 42 ranges between about 450 and about 1150 kPa and the bottom temperature in the dividing wall fractionation column 42 ranges between about 204° and about 260° C. if the feed in line 12 is predominantly a diesel boiling range feed and between about 232° and about 315° C. if the feed in line 12 is predominantly a VGO boiling range feed. Other bottom temperatures may be suitable for different feeds in line 12.

In an aspect, fractionation column 42 may be a dividing wall fractionation column 42. A dividing wall 56 may divide the dividing wall column 42 into separate compartments on a first side 58 and a second side 60. In this aspect, the first hydroprocessed effluent is fed to the first side 58 of the dividing wall fractionation column 42 through inlet 31, so the first side 58 is in downstream communication with the first hydroprocessing reaction zone 20. The diesel stream is recovered at a bottom of the first side 58 of the dividing wall fractionation column 42. In an aspect, the dividing wall 56 extends to the bottom of the dividing wall fractionation column 42 and is sealed to a bottom and inner walls of the dividing wall column to prevent fluid communication between compartments on the first side 58 and the second side 60 at any location below a top of the dividing wall 56. The first hydroprocessed effluent is fed to the first side 58 at inlet 31 located below a top of the dividing wall 56. The dividing wall column may be a dividing wall stripper 42 which utilizes inert gas injection into the bottom of the first side to strip gaseous components from the downflowing liquid instead of utilizing a reboiler. The inert gas may be hydrogen or steam, but steam is preferred. A diesel stream may exit the first side 58 through diesel outlet 43, which is located below the inlet 31 to the first side 58 at a bottom of the fractionation column 42. The bottom temperature in the first side 58 of the dividing wall fractionation column 42 ranges between about 204° and about 260° C. if the feed in line 12 is predominantly a diesel boiling range feed and between about 232° and about 315° C. if the feed in line 12 is predominantly a VGO boiling range feed.

The diesel stream 46 which comprises diesel and may comprise heavier components may not qualify as an ULSD stream because it may comprise as much as 50 to 700 wppm sulfur. We have found this to be the case when the first hydroprocessing reaction zone 20 is a hydrotreating reaction zone that operates with a continuous liquid phase. Therefore, to make ULSD, the diesel stream must be further hydrotreated. Additionally, the diesel stream in line 46 may require further hydroprocessing to achieve desired properties. In some cases, the diesel stream in line 46 may be further hydroprocessed directly in which case, line 46 carries a feed diesel stream. In an aspect, particularly when the feed 12 is heavier feed such as VGO, the fractionation zone 40 includes a fractionator column 70 and the diesel stream in line 46 may be fed to the fractionator column 70 via line 47.

The fractionator column 70 fractionates the diesel stream into a vapor line 72 which may be condensed and deposited in a receiver 74 to yield a naphtha stream 76. A portion of the naphtha stream may be refluxed to the fractionator column 70 and the other portion recovered as product in line 78. Hydrotreated heavy hydrocarbon such as VGO may be recovered from a bottom of the fractionator column in line 80 which may be an excellent feedstock to an FCC unit or a hydrocracking unit. A fractionated diesel stream in line 82 may be recovered as a side cut at outlet 81 from the fractionation column 70. In an aspect, the outlet 81 for the side cut is taken at a location above where the diesel stream in line 46 is fed to the fractionator column 70 via line 47 at inlet 49 from the fractionation column 42. In another aspect, the fractionated diesel stream in line 82 is collected as a liquid from a liquid collection device on a tray in the fractionator column 70. The top pressure in the fractionator column 70 ranges between about 110 and about 200 kPa absolute and the bottom temperature in the fractionator column 70 ranges between about 316 and about 371° C.

The diesel stream in either line 46 or 82 is fed to a second hydroprocessing reaction zone 90 or stage in feed diesel line 84. In an embodiment, the second hydroprocessing reaction zone is in downstream communication with the first side 58 of the dividing wall fractionation column 42 and the first hydroprocessing reaction zone 20. If the diesel stream in line 46 is the feed diesel stream, a control valve on line 83 is open and control valves on lines 47 and 82 are closed. If the fractionated diesel stream in line 82 is the feed diesel stream, the control valve on line 83 is closed and the control valves on lines 82 and 47 are open. It is contemplated that some intermediate variation between these two conditions may be used. The feed diesel stream carried in line 84 is at least a portion of the diesel stream in line 46 from a bottom of the fractionation column 42 which is fed directly to the second hydroprocessing reaction zone 90 or a cut produced from the fractionation column 70 in line 82. In the former aspect, the second hydroprocessing reaction zone 90 is in downstream communication with the fractionator column 70 through the side outlet 81. Moreover, the fractionator column 70 is in upstream communication with the second hydroprocessing reaction zone 90.

The feed diesel stream in line 84 is hydroprocessed with hydrogen in a second hydroprocessing reaction zone 90 with hydroprocessing catalyst to produce a second hydroprocessed effluent. The feed diesel stream in line 84 is preheated and combined with a hydrogen gas stream in line 85. The hydrogen gas stream may be provided from a make-up gas compressor (not shown). In an aspect, hydrogen in line 85 is only provided via a make-up gas compressor supplied from a general refinery hydrogen supply. The hydrogen gas stream from line 85 is admixed with the feed diesel stream in line 84 to provide an admixture of the feed diesel stream and hydrogen in line 86.

The combined stream 86 is heated in a fired heater and fed to the second hydroprocessing reaction zone 90. The second hydroprocessing reaction zone 90 may have more than one hydroprocessing reactor 92. The second hydroprocessing reaction zone 90 shown in the FIGURE has only one hydroprocessing reactor 92. More hydroprocessing reactors are contemplated. The hydroprocessing reactors 92 may have just one bed of hydroprocessing catalyst 94 or have multiple hydroprocessing catalyst beds. A second hydroprocessed effluent exits the second hydroprocessing reaction zone 90 in line 96.

The hydroprocessing reactor 92 in the second hydroprocessing reaction zone 90 may be operated in a continuous liquid phase as explained with respect to the first hydroprocessing reaction zone 20. Hydrogen may be added to the hydroprocessing reactor 92 as explained with respect to the first hydroprocessing reaction zone 20. Product recycle or diluent may be supplied to the hydroprocessing reactor 92 as explained with respect to the first hydroprocessing reaction zone 20.

The hydroprocessing that takes place in the second hydroprocessing reaction zone can include, without limit, hydrotreating such as hydrodesulfurization, hydrocracking and hydroisomerization. The hydroprocessing reactions promoted in the second hydroprocessing reaction zone 90 may be the same or different as the hydroprocessing reactions promoted in the first hydroprocessing reaction zone 20. If the second hydroprocessing reaction zone 90 is a hydrotreating reaction zone 90 and the first hydroprocessing reaction zone is a first hydrotreating reaction zone 20, the second hydroprocessing zone 90 may be a second hydrotreating reaction zone 90. In this aspect, one or more of the hydroprocessing reactors 92 are hydrotreating reactors 92 with one bed 94 or more beds 94 of hydrotreating catalyst. Moreover, in this aspect, the second hydroprocessed effluent in line 96 is a second hydrotreated effluent in line 96.

Much of the nitrogen and sulfur species are removed as off-gas from the fractionation column 42, so the second hydroprocessing catalyst in the second hydroprocessing zone 90 is much more effective in converting feed diesel into useable products. With nitrogen and sulfur species absent, the hydrotreating catalyst if used as the catalyst in the hydrotreating reactor 92 is effective in removing remaining sulfur species to produce ULSD. In this aspect, a hydrotreated effluent which may be the second hydrotreated effluent comprising ULSD exits the second hydroprocessing reaction zone 90 in line 96.

Although not shown, the second hydroprocessed effluent in line 96 may be flashed to separate gas from liquid and a relief valve installed on the gas line to relieve the hydroprocessing reaction zone 90 in the event of overpressurization. The gas and liquid stream may be recombined downstream of the relieve valve.

The second hydroprocessed effluent in line 96 may be fed to the fractionation column 42 to fractionate the second hydroprocessed effluent into off-gas and unstabilized naphtha and produce a hydroprocessed diesel stream in line 98 exiting a bottom of the second side 60 through an outlet 99 which is below the inlet 97. The hydroprocessed diesel in line 98 may be an ultra-low sulfur diesel stream if one or both of the first and second hydroprocessing reaction zones 20 and 90 are hydrotreating reaction zones.

In an aspect, the fractionation column 42 is a dividing wall column and the second hydroprocessed effluent is fed to the second side 60 of the dividing wall 56 in the dividing wall fractionation column 42 through inlet 97, so the second side 60 of the dividing wall fractionation column is in downstream communication with the second hydroprocessing reaction zone 90. The inlet 97 to the second side 60 is at an elevation lower than a top of said dividing wall 56. In an aspect, the dividing wall 56 extends to the bottom of the dividing wall fractionation column 42 and is sealed to the bottom and sides of the dividing wall column to prevent communication between the first side 58 and the second side 60 at any location below a top of the dividing wall 56. The second hydroprocessed effluent is fed to the second side 60 below a top of the dividing wall 56. The dividing wall column may be a dividing wall stripper 42 which utilizes inert gas injection into the bottom of the first side to strip gaseous components from the downflowing liquid instead of utilizing a reboiler. The inert gas may be hydrogen or steam, but steam is preferred. The bottom temperature in the second side 60 of the dividing wall fractionation column 42 ranges between about 204 and about 260° C.

The hydroprocessed diesel stream is recovered at a bottom of the second side 60 of the dividing wall fractionation column 42 from outlet 99. The hydroprocessed diesel may be ULSD if one or both hydroprocessing zones 20 and 90 are hydrotreating reaction zones.

The "hydroprocessing" that may be performed in any of the hydroprocessing reactors 22, 24 or 92 may be "hydrotreating" which may also include saturation and catalytic dewaxing.

In hydrotreating, hydrogen gas is contacted with hydrocarbonaceous feedstock in the presence of suitable catalysts which are primarily active for the removal of heteroatoms, such as sulfur and nitrogen from the hydrocarbon feedstock.

In hydrotreating, unsaturated hydrocarbons are saturated. Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same reaction vessel. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Preferred hydrotreating reaction conditions include a temperature from about 204° C. (400° F.) to about 482° C. (900° F.), a pressure from about 3.5 MPa (500 psig) to about 17.3 MPa (2500 psig), a liquid hourly space velocity of the fresh hydrocarbonaceous feedstock from about 0.1 $hr^{-1}$ to about 10 $hr^{-1}$ with a hydrotreating catalyst or a combination of hydrotreating catalysts. In an aspect, hydrotreated effluent having a lower sulfur concentration and an improved cetane number than that of the hydrocarbonaceous feedstock exits the hydrotreating reaction zone 20 in line 30 and enters a fractionation zone 40.

The "hydroprocessing" that may be performed in any of the hydroprocessing reactors 22, 24 or 92 may be "hydrocracking". Hydrocracking refers to a process in which hydrocarbons crack in the presence of hydrogen to lower molecular weight hydrocarbons. Depending on the desired output, the hydrocracking zone may contain one or more beds of the same or different catalyst. In one aspect, for example, when the preferred products are middle distillates, the preferred hydrocracking catalysts utilize amorphous bases or low-level zeolite bases combined with one or more Group VIII or Group VIB metal hydrogenating components. In another aspect, when the preferred products are in the gasoline boiling range, the hydrocracking zone contains a catalyst which comprises, in general, any crystalline zeolite cracking base upon which is deposited a minor proportion of a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

The method for incorporating the hydrogenating metal is to contact the zeolite base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° to about 648° C. (about 700° to about 1200° F.) in order to activate the catalyst and decompose ammonium ions. Alternatively, the zeolite component may first be pelleted, followed by the addition of the hydrogenating component and activation by calcining.

The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between about 5 and about 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 232° C. (450° F.) to about 468° C. (875° F.), a pressure from about 3.5 MPa (500 psig) to about 16.5 MPa (2400 psig) and a liquid hourly space velocity (LHSV) from about 0.1 to about 30 $hr^{-1}$. In some aspects, the hydrocracking reaction provides conversion of the hydrocarbons in the process stream to lower boiling products, which may be the conversion of at least about 5 vol-% of the process flow. In other aspects, the per pass conversion in the hydrocracking zone may be in the range from about 15 percent to about 70 percent and, preferably, the per-pass conversion is in the range from about 20 percent to about 60 percent. In such aspects, the processes herein are suitable for the production of naphtha, diesel or any other desired lower boiling hydrocarbons.

The "hydroprocessing" that may be performed in any of the hydroprocessing reactors 22, 24, 92 may be "hydroisomerization". Hydroisomerization also includes catalytic dewaxing. Hydroisomerization is a process in which in one aspect at least about 10 percent, in another aspect, at least about 50 percent and, in yet another aspect, about 10 to about 90 percent of the n-paraffins of the hydrocarbon feedstock are converted into iso-paraffins effective to provide an effluent with at least one of a cloud point value of about 0° C. (32° F.) or less, a pour point value of about 0° C. (32° F.) or less, and/or a cold filter plugging point (CFPP) value of about 0° C. (32° F.) or less. In general, such hydroisomerization conditions include a temperature from about 260° C. (500° F.) to about 371° C. (700° F.), a pressure from about 1.38 MPa (200 psig) to about 8.27 MPa (1200 psig), a liquid hourly space velocity of the fresh hydrocarbon feedstock from about 0.1 $hr^{-1}$ to about 10 $hr^{-1}$. However, other hydroisomerization conditions are also possible depending on the particular feedstocks being treated, the compositions of the feedstocks, desired effluent compositions, and other factors.

Suitable hydroisomerization catalysts are any known conventional hydroisomerization catalysts. For example, suitable catalysts can include zeolite components, hydrogenation/dehydrogenation components, and/or acidic components. In some forms, the catalysts can include at least one Group VIII metal such as a noble metal (i.e., platinum or palladium). In other forms, the catalyst may also include silico alumino phosphate and/or zeolite alumino silicate. Examples of suitable catalysts are disclosed in U.S. Pat. No. 5,976,351; U.S. Pat. No. 4,960,504; U.S. Pat. No. 4,788,378; U.S. Pat. No. 4,683,214; U.S. Pat. No. 4,501,926 and U.S. Pat. No. 4,419,220; however, other isomerization catalysts may also be used depending on the feedstock composition, operating conditions, desired output, and other factors.

EXAMPLE

To show the difficulty of desulfurizing diesel into ULSD, a straight run diesel boiling range feedstock having the properties in Table 1 was subjected to hydrotreating with a continuous liquid phase.

TABLE 1

| API | 28.73 |
|---|---|
| Sulfur, wppm | 1.37 |
| Nitrogen, wppm | 150 |
| Monoaromatics, wt-% | 21.7 |
| Diaromatics, wt-% | 12.6 |
| Polyaromatics, wt-% | 1.7 |
| Bromine Number | 6 |
| ASTM Distillation Method D-86, ° F. (° C.) | |
| IBP | 510 |
| 5% | 550 |
| 10% | 561 |
| 30% | 580 |
| 50% | 593 |
| 70% | 607 |
| 90% | 630 |
| 95% | 643 |
| EP | 659 |

The diesel feed was hydrotreated over a nickel-molybdenum catalyst having an amorphous alumina trilobe base. Conditions included a continuous liquid phase with a recycle rate of 5 to 1 to ensure sufficient hydrogen was present in solution. Other process conditions as well as results are presented in Table 2.

TABLE 2

| LHSV based on fresh feed, $hr^{-1}$ | 2.0 | 2.0 |
|---|---|---|
| Pressure, psig (kPa) | 600 (4,137) | 1200 (8,274) |
| Temperature, ° F. °(C.) | 625 (329) | 625 (329) |
| Sulfur, wppm | 3150 | 2100 |
| Nitrogen, wppm | 70 | 20 |

It was projected based on the degree of desulfurization at these conditions that desulfurization to produce ULSD could not be achievable in the a temperature range of 700-720° F. (371-382° C.) with a continuous liquid phase. If desulfurization were achievable with a continuous liquid phase at greater temperatures, catalyst life would be so severely curtailed, that operation under these conditions would not be economical.

A product from hydrotreated VGO boiling in the diesel range had the properties presented in Table 3. This diesel feed was selected to simulate diesel that had been subjected to hydrotreating and separation to remove hydrotreating products such as hydrogen sulfide and ammonia which can impede further hydrodesulfurization.

TABLE 3

| API | 28.59 | |
|---|---|---|
| Sulfur, wppm | 554 | |
| Nitrogen, wppm | 246 | |
| Monoaromatics, wt-% | 42.3 | |
| Diaromatics, wt-% | 7.5 | |
| Polyaromatics, wt-% | 1.1 | |
| Bromine number | 6 | |
| ASTM Distillation Method, ° F. (° C.) | D-2287 | D-86 |
| IBP | 343 (173) | 482 (250) |
| 5% | 416 (213) | |
| 10% | 450 (232) | 490 (254) |
| 30% | 520 (271) | 508 (264) |
| 50% | 567 (297) | 553 (289) |
| 70% | 608 (320) | 583 (306) |
| 90% | 663 (351) | 627 (331) |
| 95% | 686 (363) | |
| EP | 755 (402) | 635 (335) |

The feed of Table 3 was hydrotreated in a continuous liquid phase to produce ULSD. Diesel produced from hydrotreating VGO, although apparently relatively low in sulfur, is very difficult to hydrotreat to low sulfur levels because remaining sulfur species are resistant to conversion. The hydrotreating catalyst used was a nickel-molybdenum on an amorphous alumina trilobe base. Process conditions as well as results are presented in Table 4.

TABLE 4

| LHSV based on fresh feed, $hr^{-1}$ | 1.02 |
|---|---|
| Pressure, psig (kPa) | 804 (5,543) |
| Temperature, ° F. (° C.) | 700 (371) |
| Hydrogen Addition, SCF/B ($Nm^3/m^3$) | 384 (65) |
| Hydrogen Consumption, SCF/B ($Nm^3/m^3$) | 242 (41) |
| Sulfur, wppm | 4 |
| Nitrogen, wppm | 4 |

Despite the refractory nature of the feedstock and the very low rate of hydrogen addition, hydrotreating in a continuous liquid phase was able to convert diesel feedstock into ULSD under higher temperature conditions. We believe that a hydrotreating this feed in a continuous gas phase, conventional trickle bed operation would be able to achieve ULSD under less severe conditions, as well.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for hydroprocessing hydrocarbonaceous feedstock comprising:
   a first hydroprocessing reaction zone for hydroprocessing said hydrocarbonaceous feedstock;
   a dividing wall fractionation column including a dividing wall extending to a bottom of said dividing wall fractionation column that divides the dividing wall fractionation column into a first side and a second side, said first side being in downstream communication with said first hydroprocessing reaction zone and a diesel bottoms line for removing a diesel stream from the first side;
   a second hydroprocessing reaction zone in downstream communication with said first side of said dividing wall fractionation column; said second hydroprocessing reaction zone for hydroprocessing a feed diesel stream from said first side of said dividing wall fractionation column; and
   a second side of said dividing wall fractionation column being in downstream communication with said second hydroprocessing reaction zone and a hydroprocessed diesel line for a hydroprocessed diesel stream to exit the second side, wherein communication is prevented between the diesel bottoms line and the hydroprocessed diesel line.

2. The apparatus of claim 1, wherein a diesel outlet from said first side being located below an inlet to the first side.

3. The apparatus of claim 1, wherein an inlet to the first side is at an elevation lower than a top of said dividing wall.

4. The apparatus of claim 1, wherein an inlet to the second side is at an elevation lower than a top of said dividing wall.

5. The apparatus of claim 1 wherein said second hydroprocessing reaction zone is in downstream communication with a fractionator column; wherein said second hydroprocessing reaction zone communicates with said fractionator column through a side outlet; and wherein said side outlet is above an inlet through which said dividing wall communicates with said fractionator column.

6. An apparatus for producing low sulfur diesel comprising:
   a first hydrotreating reaction zone for hydrotreating a hydrocarbonaceous feedstock to reduce its sulfur concentration and improve its cetane number;
   a dividing wall fractionation column including a dividing wall extending to a bottom of the column that divides the dividing wall fractionation column into a first side and a second side, said first side being in downstream communication with said first hydrotreating reaction zone and a diesel bottoms line for removing a diesel stream from the first side;
   a second hydroprocessing reaction zone in downstream communication with said first side of said dividing wall column; said second hydroprocessing reaction zone for hydroprocessing a feed diesel stream from said first side of said dividing wall fractionation column;
   a second side of said dividing wall fractionation column being in downstream communication with said second hydroprocessing reaction zone and a hydroprocessed diesel line for a hydroprocessed diesel stream to exit the second side, wherein communication is prevented between the diesel bottoms line and the hydroprocessed diesel line; and
   a fractionator column in downstream communication with a bottom of said first side.

7. The apparatus of claim 6, wherein an inlet to the first side is at an elevation lower than a top of said dividing wall.

8. The apparatus of claim 6, wherein an inlet to the second side is at an elevation lower than a top of said dividing wall.

9. The apparatus of claim 6 wherein said second hydroprocessing reaction zone is in downstream communication with said fractionator column.

10. The apparatus of claim 9, wherein said second hydroprocessing reaction zone communicates with said fractionator column through a side outlet.

11. An apparatus for producing low sulfur diesel comprising:
    a first hydrotreating reaction zone for hydrotreating a hydrocarbonaceous feedstock to reduce its sulfur concentration and improve its cetane number;
    a dividing wall fractionation column including a dividing wall that divides the dividing wall fractionation column into a first side and a second side, said first side being in downstream communication with said first hydrotreating reaction zone;
    a second hydroprocessing reaction zone in downstream communication with said first side of said dividing wall column; said second hydroprocessing reaction zone for hydroprocessing a feed diesel stream from said first side of said dividing wall fractionation column;
    a second side of said dividing wall fractionation column being in downstream communication with said second hydroprocessing reaction zone; and
    a fractionator column in downstream communication with said first side and in upstream communication with said second hydroprocessing reaction zone, wherein said second hydroprocessing reaction zone communicates with said fractionator column through a side outlet.

12. The apparatus of claim 11, wherein said dividing wall extends to a bottom of said dividing wall fractionation column.

13. The apparatus of claim 11, wherein an inlet to the first side and an inlet to the second side are at an elevation lower than a top of said dividing wall.

14. The apparatus of claim 11, wherein said side outlet is above an inlet through which said dividing wall communicates with said fractionator column.

* * * * *